US 6,862,285 B1

(12) United States Patent
Jeffrey et al.

(10) Patent No.: US 6,862,285 B1
(45) Date of Patent: Mar. 1, 2005

(54) METHOD AND SYSTEM FOR COMMUNICATING WITH A VIRTUAL CIRCUIT NETWORK

(75) Inventors: Mark T. Jeffrey, Wokingham (GB); Mark R. Sestak, Kirkland, WA (US); Timothy M. Moore, Bellevue, WA (US)

(73) Assignee: Microsoft Corp., Redmond, WA (US)

( * ) Notice: Subject to any disclaimer, the term of this patent is extended or adjusted under 35 U.S.C. 154(b) by 0 days.

(21) Appl. No.: 09/459,670

(22) Filed: Dec. 13, 1999

(51) Int. Cl.$^7$ .............................................. H04L 12/28
(52) U.S. Cl. .................. 370/395.3; 370/395.1
(58) Field of Search ........................ 370/395.1, 395.3, 370/395.31, 466, 467, 395.2, 410

(56) References Cited

U.S. PATENT DOCUMENTS

| | | | | |
|---|---|---|---|---|
| 5,394,402 A | * | 2/1995 | Ross ........................... | 370/402 |
| 5,457,681 A | * | 10/1995 | Gaddis et al. ............... | 370/402 |
| 5,581,552 A | * | 12/1996 | Civanlar et al. ............. | 370/396 |
| 5,752,003 A | * | 5/1998 | Hart ............................ | 709/223 |
| 5,818,842 A | * | 10/1998 | Burwell et al. .............. | 370/397 |
| 5,943,337 A | * | 8/1999 | Sasagawa ................. | 370/395.3 |
| 5,995,487 A | * | 11/1999 | Weaver et al. .......... | 370/395.21 |
| 6,141,339 A | * | 10/2000 | Kaplan et al. .......... | 370/395.61 |
| 6,182,193 B1 | * | 1/2001 | Hamami ..................... | 711/119 |
| 6,185,215 B1 | * | 2/2001 | Aho ............................ | 370/402 |
| 6,226,680 B1 | * | 5/2001 | Boucher et al. ............ | 709/230 |
| 6,324,166 B1 | * | 11/2001 | Yokoyama et al. ......... | 370/234 |
| 2003/0043791 A1 | * | 3/2003 | Kato ........................... | 370/386 |
| 2003/0200315 A1 | * | 10/2003 | Goldenberg et al. ........ | 709/225 |

OTHER PUBLICATIONS

Tanenbaum, Andrew S., "Computer Networks", 1996, Prentice Hall, Third Edition, pp. 450–455.*
McDysan, David et al., ATM Theory and Applications, 1999, McGraw–Hill, Signature Edition, pp. 405–410.*

Black, Uyless, ATM vol. 1, 1995, Prentice Hall PTR, pp. 247–254.*
Digital Technology, Inc. (DTI). *NDIS (Network Driver Interface Specification)* [web page] Jun. 7, 1998; http://www.whatis.com/ndis.htm. [Accessed Aug. 2, 1999].
Digital Technology, Inc. (DTI). *Network Driver Interface Specification (NDIS) and the Role of Digital Technology* [web page] Jun. 7, 1998. http://www.dtix.com/product/ndis-drv.html. [Accessed Aug. 2, 1999].
Microsoft Corporation. *NDIS Management Information and OIDs* [web page] Jul. 1, 1999. http://www.microsoft.com/DDK/DDKdocs/Win2kRC1/205mpinfo_13hj.htm. [Accessed Aug. 30, 1999].
Microsoft Corporation. *OIDs for Connection–Oriented Call Managers and Clients* [web page] Jul. 1, 1999. http://www.microsoft.com/DDK/DDKdocs/Win2kRC1/211cooid_74du.htm. [Accessed Aug. 30, 1999].
Microsoft Corporation. *Network OIDs* [web page] Jul. 1, 1999. http://www.microsoft.com/DDK/DDKdocs/Win2kRC1/201ndis_1mg7.htm. [Accessed Aug. 30, 1999].
Microsoft Corporation. *OID Overview* [web page] Jul. 1, 1999. http://www.microsoft.com/library/sdkdoc/crypto/usingcrypto_262f.htm. [Accessed Aug. 30, 1999].
Microsoft Corporation. *DSL Architecture Hardware White Paper* (Draft). Apr. 28, 1999.

(List continued on next page.)

Primary Examiner—Huy D. Vu
Assistant Examiner—Toan D. Nguyen
(74) Attorney, Agent, or Firm—Leydig, Voit & Mayer

(57) ABSTRACT

A host computer communicatively linked with a virtual circuit network and communicatively linked with a device over a local area network receives a virtual circuit message from the virtual circuit network, such as an asynchronous transfer mode network. A data structure associating a virtual circuit of the virtual circuit network with the device is referenced, and based on the association, the virtual circuit message is passed to the device over the local area network. The data structure may be a table containing an entry associating the virtual circuit with the device or with the network address of the device.

3 Claims, 3 Drawing Sheets

OTHER PUBLICATIONS

Microsoft Corporation. *OID Overview* [web page] Jul. 1, 1999. http://www.microsoft.com/library/sdkdoc/crypto/usingcrypto_262f.htm. [Accessed Aug. 30, 1999].

Microsoft Corporation. *Remote NDIS and Windows Networking* [web page] Nov. 24, 1999. http://www.microsoft.com/hwdev/network/rmNDIS.htm. [Accessed Mar. 30, 2000].

Microsoft Corporation. *Introduction to DSL Architecture—draft.* [web page] Apr. 28, 1999. http://www.microsoft.com/hwdev/network/dsl/dslarch.htm. [Accessed May 4, 1999].

Microsoft Corporation. *NDIS 5.0 Extensions and ATM Support in Windows* [web page] Nov. 23, 1998. http://www.microsoft.com/hwdev/devdes/ndis4_atm.htm. [Accessed May 4, 1999].

Microsoft Corporation. *Introduction to NDIS 5.0* [web page] Dec. 15, 1998. http://www.microsoft.com/hwdev/devdes/ndis5.htm. [Accessed May 4, 1999].

* cited by examiner

METHOD AND SYSTEM FOR COMMUNICATING WITH A VIRTUAL CIRCUIT NETWORK

TECHNICAL FIELD

This invention relates generally to computer networking and, more particularly, relates to a method and system for communicating with a virtual-circuit network.

BACKGROUND OF THE INVENTION

New technologies such as Digital Subscriber Line (DSL) have enabled ordinary households and small businesses to obtain broadband access to powerful computer networks, such as the Internet, over ordinary telephone company lines. The advent of new virtual-circuit protocols has made high speed voice and video communication over broadband networks efficient and practical. Virtual-Circuit protocols allow the definition of a specific data path through a network using an identifier known as a "virtual circuit." While a datagram-based transport method such as an Internet Protocol (IP) packet is permitted to travel through a variety of network links, virtual-circuit packets are forced to travel over their designated virtual circuits. One popular virtual-circuit protocol is the Asynchronous Transfer Mode (ATM) protocol. The growing use of ATM has made the transmission of real-time movies and voice over large networks such as the Internet a reality. To enhance the consumer experience with ATM, the remote NETWORK DRIVER SPECIFICATION (NDIS) developed by MICROSOFT CORPORATION may include an ATM miniport which allows a personal computer to communicate with an ATM network. The remote NDIS is the subject of U.S. patent application Ser. No. 09/302,735 for a METHOD AND SYSTEM FOR ABSTRACTING NETWORK DEVICE DRIVERS, which is incorporated by reference herein in its entirety.

With the increasing demand for access to virtual circuit networks, many households and businesses will experience internal competition for the limited number of broadband data lines, and will therefore have to institute a system of connection sharing in order to take advantage of the new virtual-circuit-based protocols. Additionally, more and more ordinary devices, such as televisions and radios, are being adapted to use networks such as the Internet, thereby increasing the competition for the use of these data lines. Thus, it can be seen that there is a need for an improved method and system for communicating with a virtual-circuit network.

SUMMARY OF THE INVENTION

In accordance with this need, an improved method and system for communicating with a virtual-circuit network is provided, in which one or more calling devices in an internal network may communicate with a virtual-circuit network, such as an ATM network, via a proxy host.

According to the method, a host computer communicatively linked with a virtual circuit network and communicatively linked with a device (which may be a personal computer) over a local area network receives a virtual circuit message from the virtual circuit network, such as an asynchronous transfer mode network. A data structure associating a virtual circuit of the virtual circuit network with the device is referenced, and based on the association, the virtual circuit message is passed to the device over the local area network. The data structure may be a table containing an entry associating the virtual circuit with the device or with the network address of the device.

The system may comprise a proxy host computer. The proxy host computer may execute several programs, including a networking program for unwrapping a device message received from the virtual circuit network to extract a virtual circuit message; a call deflector program for determining an association between a device on a local area network to which the proxy host is linked and a virtual circuit of the virtual circuit network; and a packet switching program for passing the extracted virtual circuit message to the device over the local area network based on the determined association. The networking program may be a network device interface specification layer having an asynchronous transfer mode miniport.

The proxy host may also execute a bus driver for unwrapping a bus-specific message to extract a device message received from an interface device connected to the virtual circuit network.

In addition to the proxy host, the system may further comprise a plurality of devices communicatively linked to the proxy host over the local area network, wherein each of the plurality of devices may execute the networking program to unwrap a virtual circuit message received from the proxy host to extract data and pass the data to an application program, wherein the application program provides the data to a user at the device.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
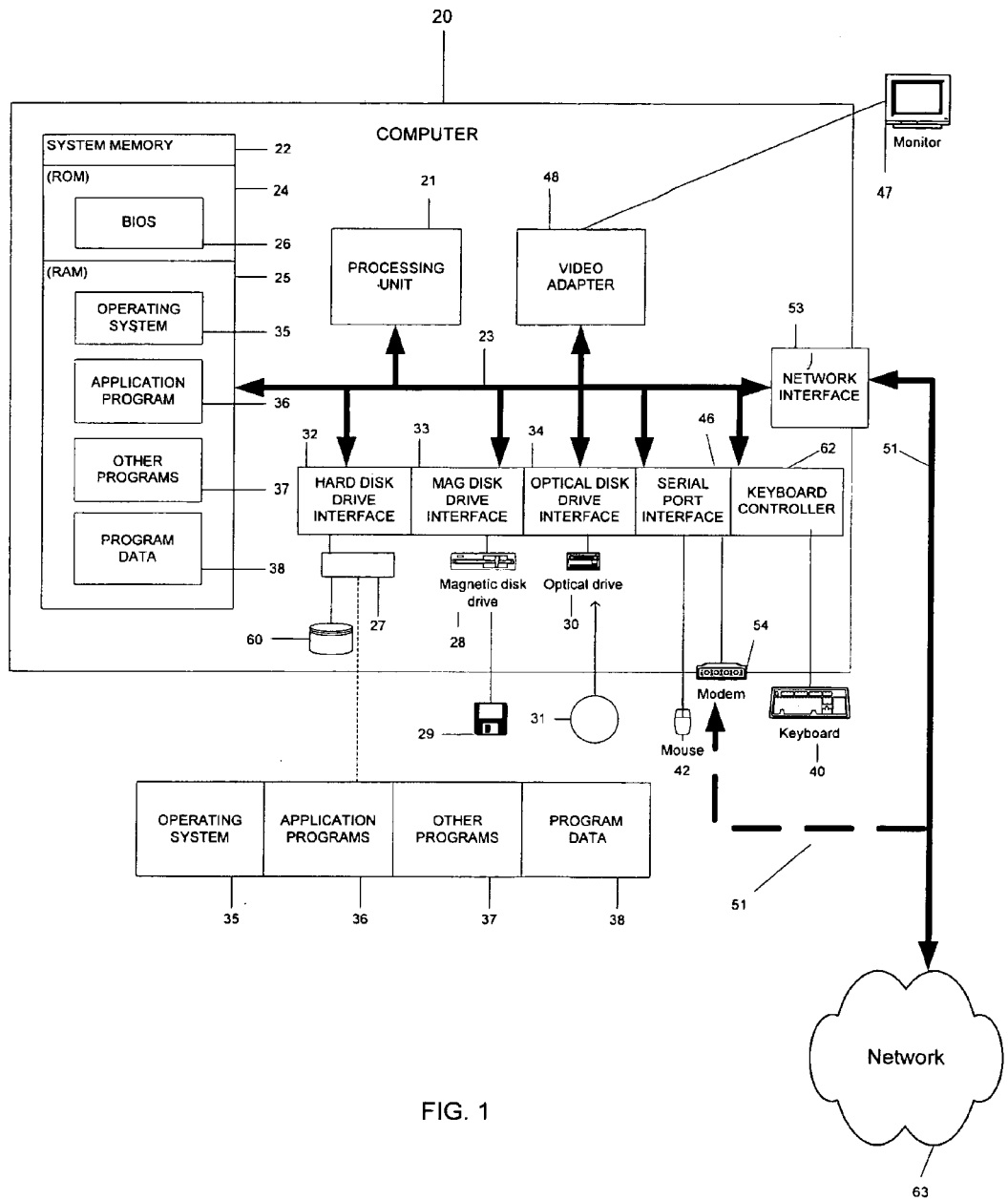
FIG. 1 is a block diagram generally illustrating an exemplary computer system on which the present invention may reside.

Turning to the drawings, wherein like reference numerals refer to like elements, the invention is illustrated as being implemented in a suitable computing environment. Although not required, the invention will be described in the general context of computer-executable instructions, such as programs, being executed by a computer or similar device. Generally, programs include routines, other programs, objects, components, data structures, dynamic-linked libraries (DLLs), executable code, etc. that perform particular tasks or implement particular abstract data types. Moreover, those skilled in the art will appreciate that the term "computer" is not meant to limit the invention to personal computers, as the invention may be practiced on hand-held devices, multi-processor systems, microprocessor based or programmable consumer electronics, network devices, minicomputers, mainframe computers, and the like. The invention may also be practiced in distributed computing environments where tasks are performed by remote processing devices that are linked through a communications network. In a distributed computing environment, parts of a program may be located in both local and remote memory storage devices.

With reference to FIG. 1, an exemplary system for implementing the invention is shown. The system includes a general purpose computer in the form of a conventional computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory may include read only memory (ROM) 24 and random access memory (RAM) 25. A basic input/output system (BIOS) 26, containing the basic routines that help to transfer information between elements within the computer 20, such as during start-up, may be stored in the ROM 24. The computer 20 may further include a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

If included in the computer 20, the hard disk drive 27, magnetic disk drive 28, and optical disk drive 30 may be connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, programs and other data for the computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of programs may be stored on the hard disk 60, magnetic disk 29, optical disk 31, ROM 24 or RAM 25, including an operating system 35, one or more applications programs 36, other programs 37, and program data 38. A user may enter commands and information into the computer 20 through input devices such as a keyboard 40, which is typically connected to the computer 20 via a keyboard controller 62, and a pointing device, such as a mouse 42. Other input devices (not shown) may include a microphone, joystick, game pad, satellite dish, scanner, or the like. Input devices as well as peripheral devices may be connected to the processing unit 21 through a serial port interface 46 that is coupled to the system bus, a parallel port, game port, universal serial bus (USB), 1394 bus, or other interfaces. A monitor 47 or other type of display device is also connected to the system bus 23 via an interface, such as a video adapter 48. In addition to the monitor, computers typically include other devices not shown, such as speakers and printers.

The computer 20 may operate in a networked environment using logical connections to one or more devices within a network 63, including another personal computer, a server, a router, a network PC, a peer device or other common network node. These devices typically include many or all of the elements described above relative to the computer 20. The logical connections depicted in FIGS. 1 and 2 include one or more network links 51, for which there are many possible implementations, including a local area network (LAN) link and a wide area network (WAN) link. Such networking links are commonplace in offices, enterprise-wide computer networks, intranets and the Internet. It will be appreciated that the network connections shown are exemplary and other means of establishing a data path between the computers may be used. When used in a LAN, the computer 20 may be connected to the network 63 through a network interface or adapter 53. When used in a WAN, the computer 20 typically includes a modem 54 or other means for establishing communications over the network link 51, as shown by the dashed line in FIG. 1. The network link 51 may also be created over public networks, using technologies such as dial-up networking, the Internet, Digital Subscriber Line (DSL), Asynchronous Transfer Mode (ATM), Virtual Private Network (VPN) or any other conventional communication method. The modem 54 may be connected to the system bus 23 via the serial port interface 46, and may be external or internal. In a networked environment, programs depicted relative to the computer 20, or portions thereof, may be stored on other devices within the network 63.

In the description that follows, the invention will be described with reference to acts and symbolic representations of operations that are performed by one or more computers, unless indicated otherwise. As such, it will be understood that such acts and operations, which are at times referred to as being executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
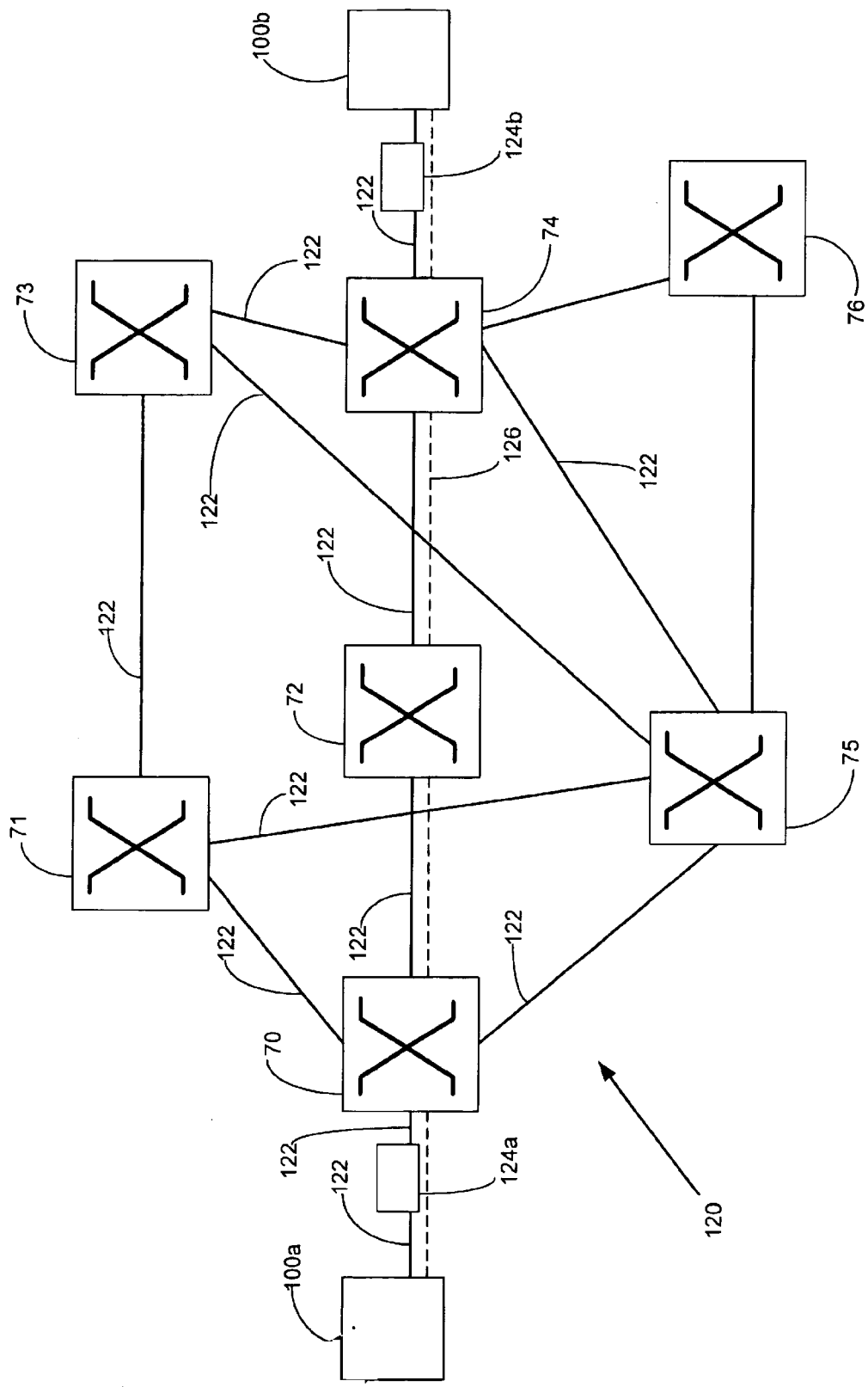
FIG. 2 is a block diagram illustrating an exemplary virtual circuit network over which a device may communicate in accordance with the invention.

The invention is generally directed to a method of communicating with a virtual circuit network, such as an ATM network 120 shown in FIG. 2. The ATM network 120 includes ATM switches 70–76 which are communicatively linked to one another by network links 122. Each switch 70–76 may include hardware and software for sending and receiving data. Each switch 70–76 has one or more ports, which may be logical or physical. Each port may have one or more virtual circuits associated with it. Each ATM cell has "virtual circuit" (VC) identifier to indicate the virtual circuit over which the cell is to travel. A VC is an abstract boundary between switch-based communication sessions, and as applied to ATM communication, generally represents the combination of an ATM "virtual path identifier" (VPI) and an ATM "virtual channel identifier" (VCI). Thus, an ATM message having a VPI of 3 and a VCI of 1 is said to be traveling "VC 3:1."

One or more computers, such as the computers 100a and 100b, may be linked to the network 120 via ATM interface devices 124a and 124b. The ATM interface devices 124a and 124b convert ATM cells into a standard networking format, such as USB, and vice versa, using an ATM driver. When an ATM call is placed from an originating computer 100*a* to a receiving computer 100*b* via the network 120, an ATM Setup signal is transmitted from the originating computer 100*a* to the ATM interface device 124*a*, which then transmits the ATM Setup signal over a VC conventionally designated for signaling (typically VC 0:5). The ATM Setup signal is then relayed among the switches 70–74 along a data path 126 until it reaches the ATM interface device 124*b*, which translates the ATM Setup signal into a format understandable by the receiving computer 100*b*. To accept the call, the computer 100*b* transmits an ATM Connect signal to the ATM interface device 124*b*, which transmits the ATM Connect signal back through the network 120 along the data path 126. As the acceptance signal travels back to the computer 100*a*, each switch along the way processes the acceptance signal by allocating a new virtual circuit to be used for all further ATM communication between the device 100*a* and the device 100*b* along that segment of the data path 126. For example, the switch 74 may allocate VC 0:35 for ATM communication between it and the device 100*a* and VC 0:34 for the ATM communication between it and the switch 72. Switch 72, in turn, may allocate VC 0:35 for the ATM communication between it and the switch 70. Finally, the switch 70 may allocate VC 0:33 for communication between it and the computer 100*b*.

To ensure that the communication between the device 100*a* and 100*b* travels over the correct VC's, each switch stores an entry that associates an input VC of an input port with an output VC on an output port. For example, it is assumed that the switch 74 of FIG. 2 has two ports: Port X, which is in communication with the device 20*b*, and Port Y, which is in communication with the switch 72. The switch 74 will have a table entry that associates VC 0:35 of Port X with VC 0:34 of Port Y, thereby indicating to the switch 74 that all traffic received on VC 0:35 of Port X is to be switched to VC 0:34 on Port Y for output and vice versa. When the call has concluded, one or both of the computers 100*a* and 100*b* transmits a termination signal over the network 120 and the switches 70–76 respond by deallocating the previously allocated VCs and deleting the corresponding table entries. In the case of a so-called "Permanent Virtual Circuit" (PVC), the data path 126 is permanently defined within the switches 70–76, in which case the initial setup and final deallocation processes need not occur.

Figure 3:
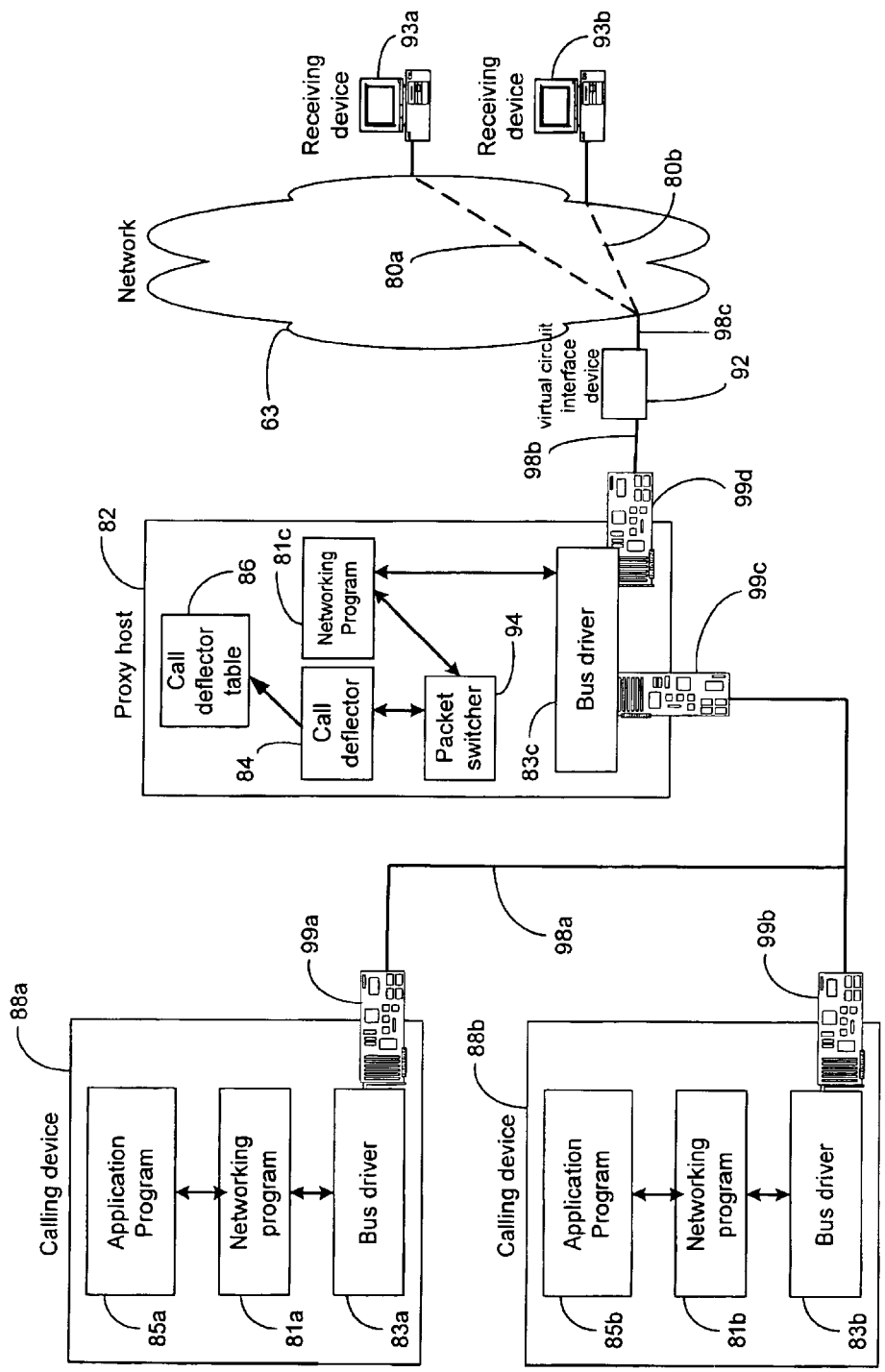
FIG. 3 is a block diagram of a network of calling devices and a proxy host configured in accordance with the invention.

In accordance with an embodiment of the invention shown in FIG. 3, calling devices 88*a*–88*b*, which may have many or all of the components of the computer 20 described in FIG. 1, are communicatively linked via network interface cards (NICs) 99*a* and 99*b* respectively to a network link 98*a*. The network link 98*a* is further linked to a proxy host 82 via a network interface card 99*c*. Although only two calling devices are shown, any number of calling devices is possible. The network link 98*a* is preferably a local area network link, such that the calling devices 88*a*–88*b* and the proxy host 82 comprise a local area network.

The proxy host 82 is communicatively linked to a virtual circuit interface device 92 via a network interface card 99*d* and a network link 98*b*. The virtual circuit interface device 92 may be implemented as an ATM-compatible Digital Subscriber Line (DSL) interface, and may include an ATM adaptation layer five (AAL 5). The virtual circuit interface device 92 is communicatively linked a virtual circuit network 96 via a network link 98*c*. The virtual circuit network 96 may be an ATM network such as the ATM network 120 of FIG. 3. To aid in a description below of how communication occurs across the network 96, it will be assumed that a receiving device 93*a* and a receiving device 93*b* are also communicatively liked to the network 96.

The calling devices 88*a* and 88*b* may each execute application programs 85*a* and 85*b*, which may receive input from or provide output to a user. The application programs 85*a* and 85*b* may include one or more protocol programs such as a TCP/IP stack, an IP Over ATM (IPOA) protocol program and a Point-to-Point Protocol Over ATM (PPPOA) protocol program. The calling devices 88*a* and 88*b* may also execute networking programs 81*a* and 81*b*, which convert data into a standard format, hereinafter referred to as a device message, that can be interpreted by networking devices. Conversely, the networking programs 81*a* and 81*b* extract data from device messages received from networking devices. The process of inserting data having one format into a message having another format will hereinafter be referred to as "wrapping" the data. Performing the process in reverse (i.e. extracting data of one format from a message having another format) will hereinafter be referred to as "unwrapping" the data. These terms are also commonly used in conjunction with protocol layers, in which data may be wrapped into, for example, a transport layer, a networking layer, a data link layer and a physical layer.

In a preferred embodiment of the invention, the networking programs 81*a* and 81*b* are implemented as a NETWORK DRIVER INTERFACE SPECIFICATION (NDIS) abstraction layer having a User Network Interface (UNI) call manager and a remote NDIS ATM miniport. NDIS is a well-known standard defined by the MICROSOFT CORPORATION, which provides a universal set of OBJECT IDENTIFIERS (OIDs) which can be understood and used by any hardware device that is NDIS-compliant. An embodiment of NDIS having a remote NDIS extension is described in U.S. patent application Ser. No. 09/302,735 for a METHOD AND SYSTEM FOR ABSTRACTING NETWORK DEVICE DRIVERS, which is incorporated by reference herein in its entirety.

Referring again to FIG. 3, the calling devices 88*a* and 88*b* in the illustrated embodiment may each execute bus drivers 83*a*–83*b* respectively. The bus drivers 83*a* and 83*b* wrap outgoing data into a bus-specific message, such as an ethernet or USB frame for transmission over the network link 98*a* via the network interface cards 99*a* and 99*b*. Conversely, the bus drivers 83*a* and 83*b* may unwrap incoming messages to extract the underlying data or protocol layers. The bus drivers 83*a* and 83*b* are preferably implemented as network specific microports which are described in previously-referenced patent application.

The proxy host 82 of the illustrated embodiment may execute a networking program 81*c* and a bus driver 83*c*, which may have the same functions and possible embodiments as the networking programs 81*a*–8*b* and bus drivers 83*a*–83*b*. Additionally, the proxy host 82 may execute a call deflector program 84 to keep track of which virtual circuit, if any, has been assigned by the virtual circuit network 96 to one or more of the calling devices 88*a*–88*b* by maintaining entries in a call deflector table 86. Each entry associates a calling device with its assigned VC. The call deflector program 86 provides this information to a packet switcher program 94, which may also be executed by the proxy host 82. Based on the information provided by the call deflector program 84, the packet switcher program 94 links the input and output signals of the calling devices 88*a* and 88*b* with corresponding input and output signals of the network 96. Thus, once communication is established between a calling device and the network 96, virtual circuit cells traveling through the host 84 are passed to their appropriate destinations.

To illustrate how communication occurs between devices over a virtual circuit network in accordance with the present invention, reference is made to FIG. 3 and the following example, in which concurrent virtual circuit calls are made from the calling devices 88a and 88b. It is assumed in this example that the calling device 88a makes the first virtual circuit call to the receiving device 93a, followed by a second virtual circuit call from the calling device 88b to the receiving device 93b. It is also assumed that the virtual circuit interface device 92 is capable of sending, receiving and interpreting the device messages of the networking programs 81a–81c. In a remote NDIS implementation, the interface device 92 would be known as "Remote NDIS compliant."

The application program 85a on the calling device 88a sends a request for a virtual circuit connection to the networking program 81a. The request may include the destination address of the receiving device 93a. The networking program 81a generates a virtual circuit "Setup" cell which may include the destination address of the receiving device 93a, wraps the cell into a device message, such as a remote NDIS OID, inserts the network address of the calling device 88a into the device message, and sends the device message to the bus driver 83a. The bus driver 83a wraps the device message into a bus-specific message, such as an Ethernet or USB frame, and sends the bus-specific message over the network link 98a via the NIC 99a to the NIC 99c on the proxy host 82.

At the proxy host 82, the bus driver 83c receives the bus-specific message from the NIC 99a, extracts the device message from the bus-specific message and sends the device message to the networking program 81c. The networking program 81c reads the network address (of the calling device 88a) from the device message and extracts the virtual circuit cell from the device message. The networking program 81c passes the virtual circuit cell to the packet switcher program 94 along with the network address of the originating device (calling device 88a).

The packet switcher program 94 relays the virtual circuit cell and the originating network address to the call deflector program 84. In response to receiving this information, the call deflector program 84 examines the originating network address of the device message, generates a call reference value to uniquely identify the calling device 88a for the duration of this call, and makes an entry in the call deflector table 86 associating that call reference value with the network address of the calling device 88a. The use of call reference values in conjunction with virtual circuit protocols is well-known. The call deflector program 84 also inserts the generated call reference value into the header of the virtual circuit cell.

The call deflector program 84 then passes the virtual circuit cell to the packet switcher program 94, which passes the virtual circuit cell to the networking program 81c. The networking program 81c wraps the virtual circuit cell into a device message, such as a remote NDIS OID, and passes the device message to the bus driver 83c. The bus driver 83c wraps the device message into a bus-specific format, such a USB frame. The bus-specific message is transmitted out through the network link 98b to the virtual circuit interface device 92. The virtual circuit interface device 92 transmits the virtual circuit cell to the network 96 over the network link 98c in the appropriate physical format, such as DSL.

The virtual circuit cell is relayed through a series of switches, for example, the ATM switches 70–74 of the ATM network 120 of FIG. 2, to the receiving device 93a. The receiving device 93a will respond with a virtual circuit Connect cell sent back through the network 96. At each switch along way, a virtual circuit will be assigned for communication between the receiving devices 93a and 93b, thereby creating a data path 80a through the network 96. The virtual circuit "Connect" cell contains the virtual circuit number to be used in further communications by the requesting device (calling device 88a).

The virtual circuit interface device 92 receives the virtual circuit "Connect" cell and wraps it into device message, such as a remote NDIS "create virtual circuit" OID and sends the device messages over the network link 98b wrapped into a busspecific message, such as a USB frame; The bus-specific message travels through the bus driver 83c, in which the device message is extracted from the bus frame and passed to the networking program 81c. The networking program 81c unwraps the device message, extracts the virtual circuit "Connect" cell, and passes the virtual circuit "Connect" cell to the packet switcher program 94.

The packet switcher program 94 then relays the "Connect" cell to the call deflector program 84. The call deflector program 84 reads the virtual circuit assignment and the call reference value from the "Connect" cell, correlates the call reference value with the network address of the calling device 88a, and based on that correlation, makes an entry in the table 86 that associates the network address of the calling device 88a with the assigned virtual circuit The packet switcher program 94 sends the virtual circuit "Connect" cell to the networking program 81c which rewraps the cell into a device message, such as a remote NDIS OID, and sends the device message to the bus driver 83c. The bus driver 83c wraps the device message into a bus-specific message and sends it to the calling device 88a.

When the bus-specific message reaches the calling device 88a, the bus driver 83a unwraps it and extracts the device message. The bus driver 83a passes the device message to the networking program 81a, which unwraps the device message (e.g. by interpreting a remote NDIS OID), and extracts the virtual circuit "Connect" cell. The networking program 81a recognizes the virtual circuit "Connect" cell as being a response to the virtual circuit request, and stores the value of the assigned virtual circuit in a data structure for use during the subsequent virtual circuit call. The networking program 81a then notifies the application program 85a that the virtual circuit call may proceed.

The application program 85a may then begin passing data to the networking program 81a for transmission to the receiving device 93a during the virtual circuit call. The networking program 81a may create virtual circuit data cells containing the data received from the application program 85a and insert the correct virtual circuit number into the headers of the virtual circuit data cells, so that the cells will be appropriately transmitted across the network 96 to the receiving device 93a.

From this point forward, the packet switcher program 84 will relay virtual circuit data cells originating from the calling device 88a to the virtual circuit network 96. Furthermore, when the proxy host 82 receives incoming virtual circuit cells from the network 96, the call deflector program 84 will reference the call deflector table 86, correlate the network address of the calling device 88a with the virtual circuit of the incoming cells, and pass the virtual circuit cells received from the network 96 on that virtual circuit to the packet switcher program 94 for transmission to the calling device 88a based on that correlation. The entry in the call deflector table 86 will persist until a "Release" message is generated by the calling device 88a or the network 96. The entry may then be deleted.

While the communication between the calling device 88*a* and receiving device 93*a* is still occurring, the calling device 88*b* may place a call to the receiving device 93*b* by performing the steps described above as well. During the call setup, the call deflector program 84 assigns a call reference value to the calling device 88*b* that is distinct from that assigned to the calling device 88*a*. The network 96 assigns a virtual circuit to that call as well, thereby creating a data path 80*b* over the network 96 to the receiving device 93*b*. The call deflector program 84 will create an entry it the call deflector table 86 that associates the assigned virtual circuit with the calling device 88*b*. From that point on, the calling device 88*a* and the calling device 88*b* will each have their own virtual circuit over which to communicate with the network 96, and the packet switcher program 84 will cause the packet switcher program 94 to switch all of the data to and from the network 96 according to the entries in the call deflector table 86. Thus, from the point of view of the application programs 85*a* and 85*b*, the proxy host 82 appears as if it was the ATM interface device 92. This allows the application programs 85*a* and 85*b* to communicate with the network 96 as if they were connected directly to it.

One or more application programs (not shown) executing on the proxy host 82 may make virtual circuit calls in parallel with one or more of the calling devices linked to the proxy host 82. When an application program on the proxy host 82 makes a virtual circuit call, an entry may be created in the call deflector table 86 in the same manner as described above with respect to the calling device 88*a*.

It can be seen from the foregoing description that a novel method of communicating with a virtual circuit-based network has been provided. In view of the many possible embodiments to which the principles of this invention may be applied, it should be recognized that the embodiment described herein with respect to the drawing figures is meant to be illustrative only and should not be taken as limiting the scope of invention.

Those of skill in the art will recognize that the software components which are depicted in FIGS. 1–3 as labeled boxes are meant to be exemplary only. Each box may represent a single program, or a group of programs. It will also be understood that although a software component may be illustrated as a single box, it may, in reality, be comprised of user-mode components as well as kernel-mode components. Also, the arrows drawn between the various software components (boxes) are not meant to be exclusive, as many of these components may communicate with components that are not shown.

Furthermore, elements of the illustrated embodiment shown in software may be implemented in hardware and vice versa. The illustrated embodiment may also be modified in arrangement and detail without departing from the spirit of the invention.

Therefore, the invention as described herein contemplates all such embodiments as may come within the scope of the following claims and equivalents thereof.

We claim:

1. A method for a host computer communicatively linked to a local area network (LAN) and a virtual circuit network to handle communications between a LAN device and a virtual circuit interface device, the method comprising the steps of:

intercepting a request sent to the virtual circuit interface device from the LAN device;

extracting a network address of the LAN device from the request;

forwarding the request to the virtual circuit interface device;

receiving a virtual circuit response from a virtual circuit device through the virtual circuit interface device, the response including a virtual circuit identifier assigned to a virtual circuit connection;

storing in a table a correlation between the network address from the request and the virtual circuit identifier from the response; and forwarding the response to the LAN device, wherein the virtual circuit interface device is a Remote Network Drive Interface Specification (RNDIS) device, the request is an RNDIS-compliant message, and the response is an RNDIS-compliant message.

2. The method of claim 1, further comprising mediating communication on the virtual circuit connection using the correlation stored in the table.

3. The method of claim 1, wherein the host computer appears as the virtual circuit interface device to the LAN device.

\* \* \* \* \*